Jan. 30, 1945. W. H. GREEN 2,368,354
LIQUID TREATING APPARATUS AND PROCESS
Filed June 13, 1938
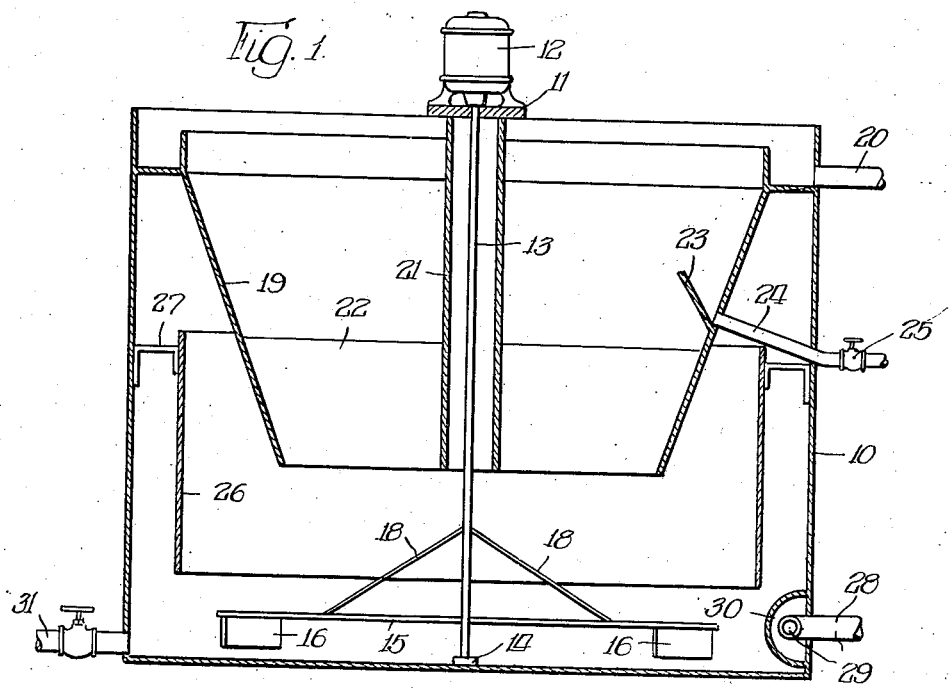
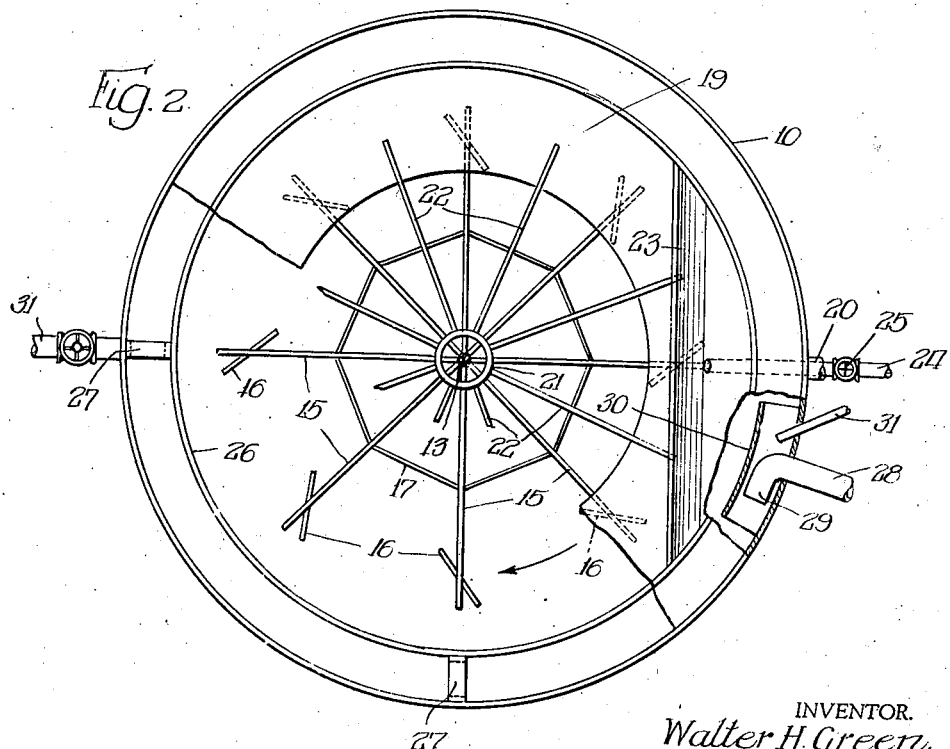
INVENTOR.
Walter H. Green,
BY Cromwell, Greist & Warden
ATTORNEYS Patented Jan. 30, 1945

2,368,354

UNITED STATES PATENT OFFICE 2,368,354

LIQUID TREATING APPARATUS AND PROCESS

Walter H. Green, Chicago, Ill., assignor to Infilco Incorporated, a corporation of Delaware Application June 13, 1938, Serial No. 213,415

27 Claims. (Cl. 210—16)

The present invention relates to a method and apparatus for removal of substances from liquids in solid form.

A principal application of the invention is concerned with the softening, clarification and stabilization of water and the following description will be with reference thereto.

The process involves the continuous formation, conditioning and removal of precipitates by providing a lower mixing and reaction zone in which there is maintained a slurry of previously separated solids, and an upper clarification zone. One of the principal objects of the invention is to treat hard water in such a manner as to cause the precipitation of solids of the hardness-imparting substances in the presence of previously separated solids maintained in a state of suspension and in a zone of general rotation, the water then being passed upwardly through a baffled clarification zone.

Another object of the invention is the softening of water by continuous treatment in which there is established in the lower portion of a tank a mixing and reaction zone having concentrated conditioned slurry of previously separated solids set in rotary motion by an agitator which creates a sufficient tangential pressure to provide upward movement of liquid from the outer portion of the tank followed by downward movement around a baffle, the downward movement leading to a clarification zone.

Still another object of the invention is the provision of a water softening process in which there is provided a mixing and reaction zone having a pattern of circulation established by rotating agitators having a centrifugal effect, the pattern of circulation including a general rotary movement, an outer upward movement, an inner downward movement and a central upward movement through a clarification zone, part of the liquid from the inner downward movement being recirculated and water undergoing treatment being introduced into the mixing and reaction zone to provide a softening reaction in the presence of previously separated crystalline particles of hardness-imparting constituents.

A further and special object of the invention is the provision of an improved process and apparatus of the general type described in Patent No. 2,021,672, issued November 19, 1935, in which in the lower portion of the treating tank there is provided an upstanding baffle which has the effect of creating an outer upward and an inner downward movement effected by the centrifugal action of rotary agitator.

Other objects of the invention are to provide an improved process and apparatus of the general type referred to but wherein the reaction and the circulation are such as to better and more fully utilize the space in the basin and to better condition the slurry or the solids therein to such ends as that the reaction may more quickly and completely take place, the slurry more quickly and completely condition, the water be more rapidly clarified and the required volume and time of retention of the slurry of precipitated solids may be reduced.

These and other objects will be evident upon a consideration of the following description of a preferred embodiment of the invention and by reference to the accompanying drawing, in which Fig. 1 is a vertical section taken through the center of apparatus constructed in accordance with the invention; and Fig. 2 is a horizontal partial section of the apparatus shown in Fig. 1.

In the apparatus shown in the drawing there is provided a treating tank 10 of cylindrical shape. Across the top of the tank, 10, is mounted a support member 11 having thereon a motor and reducing gear indicated at 12. From the motor and reducing gear there extends downwardly a shaft 13, the lower portion of the shaft terminating adjacent the bottom of the tank. It is preferred that the lower end of the shaft be journaled as indicated generally at 14 to provide for stability.

Shaft 13 carries a series of horizontal arms extending radially therefrom in a plane spaced above the bottom of the tank. These arms 15 carry preferably angularly disposed agitating blades 16, the angle of the blades being such that upon rotation of the shaft 13 there is created an outer pressure in the liquid in the tank. This angle will be indicated in Fig. 2. The various arms 15 may be attached together by brace members 17 and the arms may be supported upon shaft 13 by means of the support rods 18.

In the upper portion of the tank there is a truncated conical clarification chamber formed by the open ended inwardly, downwardly depending wall 19. The upper edge of the wall 19 is shown as cylindrical in shape and constitutes a weir over which spills water separated in the treating process, this water being withdrawn from the apparatus through the line 20.

The truncated conical wall 19 extends downwardly and inwardly toward the center of the tank and terminates in a plane spaced substantially above the bottom of the tank. Any suitable type of supporting structure may be used to maintain the member 19 in position in the tank. The clarification chamber need not be conical, but the wall 19 may extend vertically to form a cylindrical chamber.

There extends about the shaft 13 a relatively small casing 21 which terminates adjacent the end of the member 19. Adjacent the lower portion of the conical chamber there extends a series of radial baffles 22 which are designed to produce a stilling effect upon water being displaced upwardly in the clarification member 19. The distance these baffles extend upwardly may vary considerably. It is not necessary that they extend to the top of the conical separating member, since water rising in the latter may be sufficiently deprived of rotary movement by relatively low baffles.

Mounted on the right-hand side of the truncated conical member 19 is shown a partition 23 forming with the side of wall 19 a funnel-like compartment. From the lower portion of this compartment there extends to the outside of the tank a conduit 24, this conduit being provided with a suitable valve 25 for regulating the amount of liquid passing outwardly therethrough. It is to be understood that any number of these partitions 23 can be provided if desired.

In the tank 10 there is preferably provided a cylindrical baffle member 26 extending about the lower portion of the partition or wall 19. The baffle 26 also extends downwardly adjacent the ends of the arms 15. Support members 27 have been shown for maintaining the baffle member 26 suspended in the tank.

Raw water to be treated is introduced into the bottom of the tank through the line 28, this line having a discharge branch 29 extending alongside the inner portion of the tank in the direction of rotation of the arms 15. Surrounding and spaced from the discharge member 28 is an open-ended casing 30 through which liquid previously in the tank may be circulated. This casing 30 is desirable but may be omitted as due to the presence of the baffle 26 and the circulation so provided good mixing and reaction conditions may be had without it.

In operation of the apparatus and process raw water to be treated is introduced into the tank through the line 28 and as the tank fills with water the shaft 13 rotates in the direction shown by the arrow to impart to the liquid in the tank a general rotary motion. The jet-like effect of the water discharging through branch 29 assists in this rotary movement and causes admixture of the water entering the tank with water previously in the tank. Softening chemicals such as lime and soda may be introduced within the sleeve 30 by means of a chemical feed line 31. Preferably, the line 31 is positioned back of the point of discharge of raw water, so that the chemicals can be mixed with water previously in the tank before contact and admixture thereof with the raw water.

The chemicals and water to be softened are thoroughly admixed and there occurs a softening reaction in which crystalline particles of the hardness-imparting constituents are separated. These crystals are composed of calcium carbonate and magnesium hydroxide compounds and as the process continues the rotary movement of arms 15 causes the water containing the crystalline particles of hardness-imparting constituents to be circulated past the point at which the raw water enters the tank. The rotary movement of the water in the tank and the jet-like effect of the discharge line 29 causes previously treated liquid containing already precipitated crystalline solids to be drawn through the casing 30. This liquid containing the previously separated solids picks up the chemicals with which the raw water is to be treated and then is admixed with the raw water so that the softening reaction occurs in the presence of previously formed solids. The result of carrying out the process in this manner causes the crystalline particles to build up in size, and there are formed stable crystalline clusters.

As the water fills the tank the water and the suspended crystalline particles pass upwardly through the lower portion of the truncated conical separation member 19, and the baffles 22 act to stop the rotary motion of the water. The relative quiescence thus provided allows for separation of the water from the solids and the water rises to the top of the separation chamber 19 to spill over the weir formed by the upper edge thereof and to be withdrawn through the line 20.

In practice solids are allowed to concentrate in the apparatus during operation to build up a slurry that may contain up to 2 or 3 per cent solids, dry weight, or even considerably more, and have a volume sufficient to fill the basin up to a level above the lower edge of the wall 19. Due to the reaction taking place as described in the presence of suspended particles of previously formed precipitate the crystalline clusters thereof are continually reinforced or strengthened. As a result of this they do not have the tendency to disintegrate on stirring as with ordinary particles and consequently the rotation or speed of the agitator may be more rapid than is usually considered possible, commonly several times more rapid. This aids in securing the desired circulation of the slurry as described and also permits the agitators to be smaller to produce the same effect. The use of the baffle 26 not only secures a more complete utilization of space in the tank but also by providing a path as described which prevents short circuiting and procures a proper time interval before the entering water can reach the clarification chamber.

The nature of the slurry formed is such that it is not readily dispersed by an upward rise of water through it even at rates considerably beyond those at which ordinary sedimentation will take place, but it will expand to permit upflow of water through it while retaining crystalline particles present in the water. Its action is such that water entering the clarification chamber below and rising through a layer of slurry in the lower part thereof will emerge from the top of the slurry clarified, the upper surface of the slurry being clearly defined, this with rates of water rise up to 4 gallons per square foot per minute under favorable conditions, or even beyond.

The extent to which the suspension of solids or slurry enters the clarification chamber is dependent upon a number of things, including the rate of throughput of water being treated, and the amount of solids retained in the apparatus. When the upper level of the slurry rises above the edge of 23 solids will pass over and subside into the compartment formed by the partitions 23 and wall 19, from which they may be discharged by pipe 24, the flow through which may be controlled by valve 25. The area and depth of this chamber may be such as to provide for concentration of solids therein and so permit discharge thereof with but a small quantity of water. This arrangement provides a means for governing the upper level of slurry in the clarification chamber by placing the top edge of 23 at the desired elevation. As new solids are formed solids will be displaced into the clarification chamber, the level of slurry therein will rise, and the excess solids will escape over partition 23. Thus, there may be a continuous forward displacement of both solids and water, the latter of course at a very much greater rate, the water escaping from the surface of the slurry to rise to the outlet while the solids are withdrawn at the top of the slurry. This aids in the control of the nature of the slurry as well as its volume.

In the lower portion of the tank which constitutes the mixing and reaction zone there is a general rotary movement together with local eddies provided by the agitating mechanism and the jet-like effect of the discharge of raw water. The general rotary movement creates an outward pressure which causes liquid to rise between the cylindrical baffle 26 and the side of the tank. From the top of the baffle 26 the liquid turns downwardly and passes back toward the lower end of the chamber 19. Some of the liquid turns upwardly into the chamber while another portion of the liquid is recirculated, the amount depending upon such factors as the speed of rotation in the tank. Necessarily, as the speed of rotation increases the centrifugal force is greater and the circulation within the tank correspondingly increases. The effect of the vertical baffle 26 and the centrifugal force of the agitating mechanism provides for a particularly effective conditioning of the solids and the rapid and thorough completion of the reaction. The effectiveness of a process of this type depends greatly upon the type of crystalline particles that are formed by the operation of the process. Unless the crystalline particles form into relatively stable clusters or particles of substantial size and capacity, considerable difficulty is encountered in the clarification.

The baffle 26 and the agitating mechanism provides for a definite use of and circulation of the entire mixing and reaction zone. In the patent, No. 2,021,672, the water is introduced at the top of the tank and the mixing zone has an indefinite action considerably less desirable than the pattern of circulation the present invention provides. That is, the present process involves a more definite and effective use of the space in the mixing zone and thereby provides better condition of particles per unit apparatus and time. The better conditioning of the crystalline particles in accordance with the present invention is indicated by the fact that the truncated conical member 19 may provide little expansion toward the upper portion of the tank and consequently only a slightly decreased velocity in the rising water and at the same time effective clarification is obtained. In fact, it is possible to use a cylinder in place of the truncated conical member 19 so that the upper rate of rise is substantially constant throughout the clarification zone.

The slurry content of the tank may be controlled by withdrawal of the proper volume of slurry through drain 31 which communicates with the bottom of the tank, the high concentration of the slurry making possible a balance of solids by withdrawal of a relatively small quantity of slurry as compared with the rate of raw water inflow. Drain 31 also may be used to withdraw the contents of the tank during periods of shutdown.

The invention has been described specifically in connection with the softening of hard water in which substances in solution are removed from the water in crystalline form. In other applications of the invention the formation of crystals and crystalline clusters may not occur as in the case of softening hard water. For instance, the invention has great utility in the clarification of turbid water such as river water and coagulants such as alum and iron salts may be employed to form a precipitate which will attach to and increase the separation characteristics of solid particles previously in the naturally turbid water. Even in the softening process it is desirable in many instances to employ a coagulant in addition to the reagents for forming insoluble compounds of calcium and magnesium.

Many changes may be made in the apparatus and process described herein for purposes of illustration and explanation, and such changes are intended to be included in the appended claims.

I claim:

1. The process of treating water that includes the separation of solids therefrom, which comprises maintaining in a general mixing and reaction zone a slurry containing suspended solids separated from previously treated water, said zone being divided into inner and outer spaces, maintaining a general rotary movement of the slurry in said zone, imposing on said rotary motion a vertical circulation through said inner and outer spaces, passing water to be treated into the slurry in the mixing and reaction zone, then passing slurry upwardly from said inner space into a clarification zone of relative quiescence, separating treated water from slurry in said clarification zone, and withdrawing treated water from the upper portion of said clarification zone.

2. Apparatus for removing solids from liquid by a process wherein the liquid is treated in and with a slurry, comprising a treating tank, a rotary agitating mechanism in the lower portion of said tank, a vertical baffle spaced from the bottom and the walls of said tank and surrounding the central portion of the tank, and a wall structure forming an inner clarification chamber spaced from said baffle.

3. Apparatus of the type described, comprising a treating tank, means for producing rotary motion in liquid in the bottom of said tank, means for introducing liquid to be treated into the lower portion of said tank, means for delivering treating reagent to said liquid, a cylindrical baffle in said tank spaced from the means for producing rotary movement and from the walls of the tank, an inner wall structure forming an upwardly expanding clarification chamber having upright baffles positioned therein, said clarification chamber being spaced inwardly from said cylindrical baffle, and means for withdrawing solids from said tank.

4. Water softening apparatus, comprising a tank, a central rotatable shaft in said tank, radial arms extending from said shaft, angularly disposed agitating blades on said arms adapted to throw water outwardly, a cylindrical baffle positioned above said arms and spaced from the walls of said tank, and a wall structure forming an inner clarification chamber.

5. A water treating apparatus comprising a tank, a partition structure in said tank comprising a sloping wall forming a mixing zone and a clarification zone of upwardly increasing cross-sectional area therein and so constructed and arranged as to leave a passageway between the mixing zone and the lower part of the clarification zone, agitating means in said mixing zone, a concentrating chamber formed in part by said sloping wall and in part by a partition member attached to and extending upwardly from said sloping wall at a location spaced both vertically and horizontally away from said passageway, said concentrating chamber so formed will underlie a minor portion only of the clarification zone, a solids outlet from the concentrating chamber, inlet means opening into said mixing zone and a treated liquid outlet from the upper part of the clarification zone.

6. A tank, a liquid inlet into the lower portion of said tank, a liquid outlet from the upper portion of said tank, an agitator in the lower portion of said tank adapted to set up a state of relative turbulence in liquid contained therein, an inclined wall structure forming an upwardly expanding clarification chamber communicating with said lower portion of the tank and forming a path of travel for liquid from said lower portion of the tank to the upper outlet, baffle members within said clarification chamber, an open mouthed concentrating chamber within said clarification chamber and having its mouth portion positioned above said baffle members, and means for withdrawing material caught in said concentrating chamber from the lower part thereof.

7. In apparatus of the type described, comprising a tank, a partial partitioning means in said tank so positioned as to form therein a mixing chamber and a clarifying chamber and to leave a constantly open passage between said chambers, inlet means for liquid to be treated and a reagent, said means leading to the mixing chamber, means within said mixing chamber for delivering energy to water therein in addition to that contained in the entering water, and a treated liquid outlet from the upper part of the clarification chamber, a solids receiving and thickening chamber formed by a second partition, said chamber having an open mouth spaced away from and at a level above said passage, the area of the mouth being of minor cross-sectional area as compared with the area of the clarification chamber at the level of the mouth, and means for withdrawing thickened solids from said thickening chamber.

8. Apparatus of the type described, comprising side walls and a floor wall enclosing a mixing and reaction chamber, an inlet for delivering liquid to be treated into the mixing chamber, means for delivering treating reagent to said liquid, an agitator within said chamber, a sloping wall structure forming an upwardly expanding clarification chamber, a treated liquid outlet from the upper portion of said clarification chamber, an inflow communication into the lower portion of said clarification chamber from said reaction chamber, and means forming a solids concentrating chamber within said clarification chamber, an inlet into said concentrating chamber from said clarification chamber above said inflow communication and below said treated liquid outlet, the cross-sectional area of said concentrating chamber being substantially less than that of the clarification chamber at the same level, and a discharge conduit leading to waste from a lower portion of said concentrating chamber.

9. In a water treating apparatus of the type wherein water is treated in and with a slurry and treated water escapes from slurry in a clarification zone, said apparatus comprising a tank having a mixing zone in its lower portion and a treated liquid outlet from its upper portion, an inlet for water to be treated opening into said mixing zone, means for introducing reagent to said water, means for mixing water to be treated, reagent and slurry in said mixing zone, and a clarification zone of upwardly increasing cross-sectional area forming a path of upward flow of liquid from said mixing zone to said outlet, an improved means for controlling the volume of slurry comprising a partition structure so positioned and arranged as to form a solids concentrating compartment extending vertically at one side of said clarification zone and having an inlet spaced at a level above the bottom of the clarification zone, said inlet having a cross-sectional area substantially less than that of the clarification zone at the level of said inlet, and an outlet to waste from the lower portion of said compartment.

10. Apparatus for purifying liquids comprising a tank, an inclined wall structure in said tank dividing said tank into an upper clarifying zone and a lower mixing zone and so constructed and arranged as to form a constantly open passageway between said upper and lower zones, partition means above and to one side of said passageway forming a pocket in said tank, said pocket having an inlet affording communication with said clarifying zone only at a level a substantial distance above said passageway, the cross-sectional area of said pocket at the level of said inlet being minor in relation to the cross-sectional area of said clarifying zone at said level, whereby a minor portion only of solids descending in said clarifying zone enters said pocket, an outlet from the lower portion of said pocket, means for supplying liquid to be treated and a chemical reagent to the mixing zone, mechanical rotary means in the mixing zone for agitating liquid therein, and an outlet for removing purified liquid from the upper portion of the clarifying zone.

11. Apparatus for purifying liquids comprising a tank, an inclined wall structure in said tank spaced from the bottom thereof dividing said tank into an upper clarifying zone whose horizontal cross-sectional area gradually increases from the bottom to substantially the top thereof and a lower mixing zone, an opening at the lower end of said wall structure through which the clarifying and mixing zones communicate, means secured to said wall structure and spaced above the lower end of said structure to form a pocket in said tank in direct communication with said clarifying zone at a region spaced entirely above the lower end of said structure a distance equal to at least one-third and not more than two-thirds the vertical distance between the lower and upper ends of said structure, an outlet from the lower portion of said pocket, means for delivering liquid to be purified and a chemical reagent to the mixing zone, mechanical rotary means in the mixing zone for agitating liquid therein, and an outlet for removing purified liquid from the upper portion of the clarifying zone.

12. Apparatus for purifying liquids comprising a tank, an inclined partition in said tank between a lower mixing zone and an upper clarification zone and positioned to form in the latter a zone of gradually upwardly increasing cross sectional area, an open passageway between the mixing zone and the lower end of the clarification zone, means for delivering liquid to be purified and a chemical reagent into the mixing zone, mechanical rotary means in the mixing zone for agitating liquid therein, an outlet for removing purified liquid from the upper portion of the clarifying zone, a pocket within said tank having an inlet from said clarification zone, said inlet being at a level spaced above said passageway and the cross-sectional area of the inlet being less than the cross-sectional area of the clarification zone at such level, and an outlet from the lower portion of said pocket.

13. Apparatus for purifying liquid comprising a tank, an inclined wall structure in said tank spaced from the bottom thereof and separating a lower mixing and an upper clarification zone, said clarification zone being of greater cross-sectional area in its upper portion than in the lower part thereof, a passageway between said zones at the lower end of said wall structure, means forming a pocket having an inlet of cross-sectional area substantially less than that of the clarification zone at the level of said inlet, said inlet affording direct communication with said clarification zone at a level spaced substantially above the top of said passageway, an outlet from the lower portion of said pocket, means for delivering liquid to be purified and a chemical reagent into the mixing zone, mechanical rotary means in the mixing zone for agitating liquid therein, and an outlet for removing purified liquid from the upper portion of the clarification zone.

14. In the method of treating water comprising first mixing the water with a precipitating reagent in an agitating zone and then flowing the mixed water, reagent and partly formed precipitate upwardly through a quiescent precipitating zone open at the bottom and of increasing cross-sectional area upwardly, the velocity at the bottom of the precipitating zone being sufficient to support all but large particles of said precipitate and that at the top being insufficient to support any substantial particles, whereby a considerable body of precipitate remains suspended in the precipitating zone and acts as seed and larger particles descend out of the precipitating zone, the improvement that comprises withdrawing suspended solids from the body of precipitate in the precipitating zone at a predetermined upper level therein into a relatively small solids concentration zone, effecting separation of solids and liquid in such zone, and discharging solids to waste from the concentration zone.

15. Apparatus for purifying liquids comprising a tank, an inclined wall structure in said tank secured thereto and spaced from the bottom thereof and separating an upper clarifying zone from a lower mixing zone, the inclination of said wall structure being such that the cross-sectional area of said clarifying zone gradually increases from the bottom to substantially the top thereof, a passageway between said zones at the lower end of said wall structure, means forming a pocket in said tank in direct communication with said clarifying zone at a region spaced entirely above said lower end a distance equal to at least one-third of the vertical distance between the lower and upper ends of said structure, the maximum cross-sectional area of the pocket being less than the plan area of the inclined wall structure, an outlet from the lower portion of said pocket, means for delivering liquid to be purified and a chemical reagent into the mixing zone, mechanical rotary means in the mixing zone for agitating liquid therein and an outlet for removing purified liquid from the upper portion of the clarifying zone.

16. Apparatus for purifying liquids comprising a tank, a frusto-conical baffle suspended in the tank and spaced from the bottom thereof dividing said tank into an upper clarifying zone and a lower mixing zone, an opening at the lower end of said baffle through which the clarifying and mixing zones communicate, means entirely within the tank spaced from the lower end of said baffle forming a pocket that is in direct communication with the clarifying zone only above a horizontal plane spaced from the lower end of the baffle a distance equal to at least one-third the vertical distance between the lower and upper ends of said baffle, the maximum cross-sectional area of said pocket being less than the plan area of the baffle, an outlet from the lower portion of said pocket, means for delivering liquid to be purified and a chemical reagent to the mixing zone, a mechanical rotary agitating means in the mixing zone for agitating liquid therein, and an outlet for removing purified liquid from the upper portion of the clarifying zone.

17. Apparatus for purifying liquids comprising a tank, an inclined wall structure in said tank secured thereto, spaced from the bottom thereof and separating an upper clarifying zone and a lower mixing zone, the inclination of said wall structure being such as to provide in the clarifying zone a rising space of gradually increasing cross-sectional area, a passageway between said clarifying and mixing zones at the lower end of said wall structure, a partition mounted on a wall of said clarifying zone forming a downwardly tapering solids concentrating chamber, said chamber being in direct communication with said clarifying zone at a region therein spaced substantially above said passageway, the maximum cross-sectional area of the concentrating chamber being substantially less than the plan area of said clarifying zone, an outlet to waste from the lower portion of said concentrating chamber, means for delivering liquid to be purified and a chemical reagent into the mixing zone, mechanical rotary means in the mixing zone for agitating liquid therein, and an outlet for removing purified liquid from the upper portion of the clarifying zone.

18. In a method of treating water wherein raw water and a precipitating reagent are agitated and reacted in and with a slurry containing particles accumulated from previously treated water in a mixing and reaction zone, whereby the slurry is conditioned in the mixing and reaction zone, and wherein the resultant mixture with contained precipitate is passed into the lower portion of, and caused to rise at a gradually decreasing rate in, a horizontally expanding clarification zone, and clarified water is withdrawn from the upper portion of the clarification zone, the improvement which comprises causing solids to rise in the clarification zone with the water to a predetermined level spaced a substantial distance above the level of entry of water into the clarification zone, then at said predetermined level in the clarification zone withdrawing suspended solids for discharge to waste laterally from the water rising therein into a relatively small solids thickening zone above the bottom of said clarification zone and laterally adjacent said rising water, effecting further thickening of solids in such thickening zone, and discharging thickened solids to waste from the lower part of the thickening zone.

19. In a slurry type water treating apparatus comprising a tank, a mixing and reaction chamber in said tank, means for delivering water to be treated and a reagent into said mixing and reaction chamber, a clarification chamber in said tank so constructed as to have a rising space therein of upwardly increasing cross-sectional area, a passageway for liquid with suspended solids opening from the mixing and reaction chamber into the lower portion of the clarification chamber, and an outlet for removing treated liquid from the upper portion of the clarification chamber, improved means for governing the rise of solids in the clarification chamber by diverting them to waste from the rising space at a predetermined level therein that is spaced substantially above the lower end thereof, said means comprising a partition structure in said clarification chamber forming a solids concentrating compartment therein, an inlet into said compartment from said clarification chamber only at said predetermined level, and an outlet to waste from the lower portion of said concentrating compartment.

20. The process of treating water that includes the separation of solids therefrom, which comprises maintaining in a general mixing and reaction zone a slurry containing suspended solids separated from previously treated water, said zone being divided into inner and outer spaces, maintaining a general rotary movement of the slurry in said zone, imparting a vertical circulation through said inner and outer spaces to slurry in said zone in addition to said general rotary movement, passing water to be treated into the slurry in the mixing and reaction zone, then passing the slurry upwardly from said inner space through a clarification zone of relative quiescence, withdrawing clear water from the upper part of said clarification zone, withdrawing solids from the quiescent zone at an intermediate level therein into a relatively small solids concentration zone, concentrating solids in said solids concentration zone, and discharging concentrated solids to waste from said concentration zone.

21. In a method of treating water wherein raw water and a precipitating reagent are agitated in a mixing and reaction zone in and with a slurry formed of water undergoing treatment and solid particles separated and accumulated from previously treated water, the resulting slurry is passed into the lower portion of a clarification zone, and clarified water is withdrawn from the upper portion of the clarification zone, the improvement that comprises establishing a continuous upward displacement of solids in the clarification zone up to a predetermined level therein above the level of the inflow thereinto and below the level of clear water withdrawal and limiting the extent of such upward displacement by removing solids to waste at said predetermined level, said removal of solids comprising the steps of withdrawing solids from said clarification zone into a concentration zone through an open communication between said zones at said predetermined level, concentrating solids in said concentration zone, and discharging solids to waste from the lower portion of said concentration zone.

22. In combination with a liquid purifying apparatus comprising a tank, an inclined wall structure in said tank so constructed and arranged as to separate an upper clarifying zone from a lower mixing zone, said wall structure being so positioned as to form in the clarifying zone a rising space of upwardly increasing cross-sectional area, an opening forming a passageway between said zones at the lower end of said structure, an outlet for removing treated liquid from the upper portion of the clarifying zone, an inlet for delivering liquid to be purified into the mixing zone, means for delivering treating reagent to said liquid, and an agitator in the mixing zone, a partition structure spaced laterally from said passageway and forming a solids concentrating chamber in said tank, said chamber being open at the top to said clarifying zone and having an area that is minor relative to the area of the clarifying zone, and an outlet to waste from said concentrating chamber.

23. In a slurry type water purifying apparatus wherein liquid is treated with a reagent in and with a slurry containing precipitate formed in and accumulated from previously treated liquid, said apparatus comprising a wall structure enclosing a mixing and reaction chamber, means for delivering water to be purified and treating reagent into said mixing and reaction chamber, a wall structure forming a clarification chamber, a constantly open passageway between the mixing and reaction chamber and a lower portion of said clarification chamber, and an outlet for removing treated liquid from the upper portion of the clarification chamber, a partition structure extending vertically at one side of said clarification chamber so arranged as to form a solids concentrating compartment, said solids concentrating compartment having an inlet affording communication between said compartment and the clarification chamber at a level spaced above the passageway into said clarification chamber, said inlet having a cross-sectional area substantially less than that of the clarification chamber at the level of said inlet, and an outlet to waste from the lower portion of said compartment.

24. In a water treating apparatus of the type wherein water is treated in and with a slurry, said apparatus comprising a tank, a partition in said tank forming therein a mixing chamber and a clarification chamber having a side wall, a passageway adjacent the bottom of said partition affording communication between said chambers, an inlet for water to be treated opening into said mixing chamber, means for introducing reagent to said water, means in the mixing chamber for delivering energy to water in the chamber in addition to that in the water entering the chamber, and an outlet for treated water from the upper portion of said clarification chamber, a solids concentrating compartment enclosed between a part of the side wall of said clarification chamber and a partition positioned laterally of said side wall, said compartment having an upper inlet spaced above the said passageway and having a cross-sectional area substantially less than that of the clarification chamber at the level of said inlet, and a lower outlet to waste from the lower portion of said compartment.

25. In a slurry type liquid purifying apparatus comprising a tank, a mixing and reaction chamber in a lower portion of said tank, means for delivering liquid to be purified and a reagent into said mixing and reaction chamber, a clarification chamber in an upper portion of said tank confined by a sloping wall so constructed and arranged as to form in the clarification chamber a rising space of upwardly increasing cross-sectional area, a passageway for liquid and suspended solids from the mixing and reaction chamber opening into the lower portion of the clarification chamber, and an outlet for removing treated liquid from the upper portion of the clarification chamber, improved means for governing the extent of the rise of solids in the clarification chamber to a predetermined level comprising a partition structure forming a solids receiving and concentrating compartment, said concentrating compartment having an inlet opening from said clarification chamber at said predetermined level to receive solids rising in said clarification chamber to said level and an outlet to waste from the lower part of said compartment.

26. In a water treating apparatus of the type wherein water is treated in and with a slurry and treated water escapes from a clearly defined upper slurry surface, said apparatus comprising a tank, a partition in said tank dividing it into a mixing chamber and a clarifying chamber, a constantly open passageway affording communication between said chambers, an inlet for water to be treated opening into the mixing chamber, means for introducing reagent to said water, an outlet for treated water from the upper portion of the clarifying chamber and mechanical agitating means in said mixing chamber, an improved means for maintaining the slurry surface in the clarifying chamber at a predetermined level comprising a partition structure so positioned and arranged as to form a solids concentrating chamber, said chamber communicating with said clarifying chamber through an opening adjacent said predetermined level, and being so arranged as to underlie a minor portion only of said surface, and an outlet to waste from the lower part of said solids concentrating chamber.

27. In a water treating apparatus of the type wherein water is treated in and with a slurry in a mixing zone and treated water escapes from slurry in a clarification zone, said apparatus comprising a tank, a partition structure in said tank forming therein a mixing chamber and a clarification chamber having a side wall, an opening adjacent the bottom of said partition affording passageway between said chambers, an inlet for water to be treated opening into said mixing chamber, means for introducing reagent to said water, an outlet for treated water from the upper portion of said clarification chamber, and means in the mixing chamber for delivering to the water therein energy in addition to that in the water entering the chamber, a second partition structure so shaped and so positioned relative to said side wall of said clarification chamber as to form a solids concentrating compartment that is open at a level above the level of said opening and that is of less cross-sectional area than the clarification chamber at all common levels, and an outlet to waste from the lower portion of said solids concentrating compartment.

WALTER H. GREEN.